No. 796,995. PATENTED AUG. 15, 1905.
I. A. GEORGE.
ROLLER BEARING.
APPLICATION FILED JULY 1, 1903.
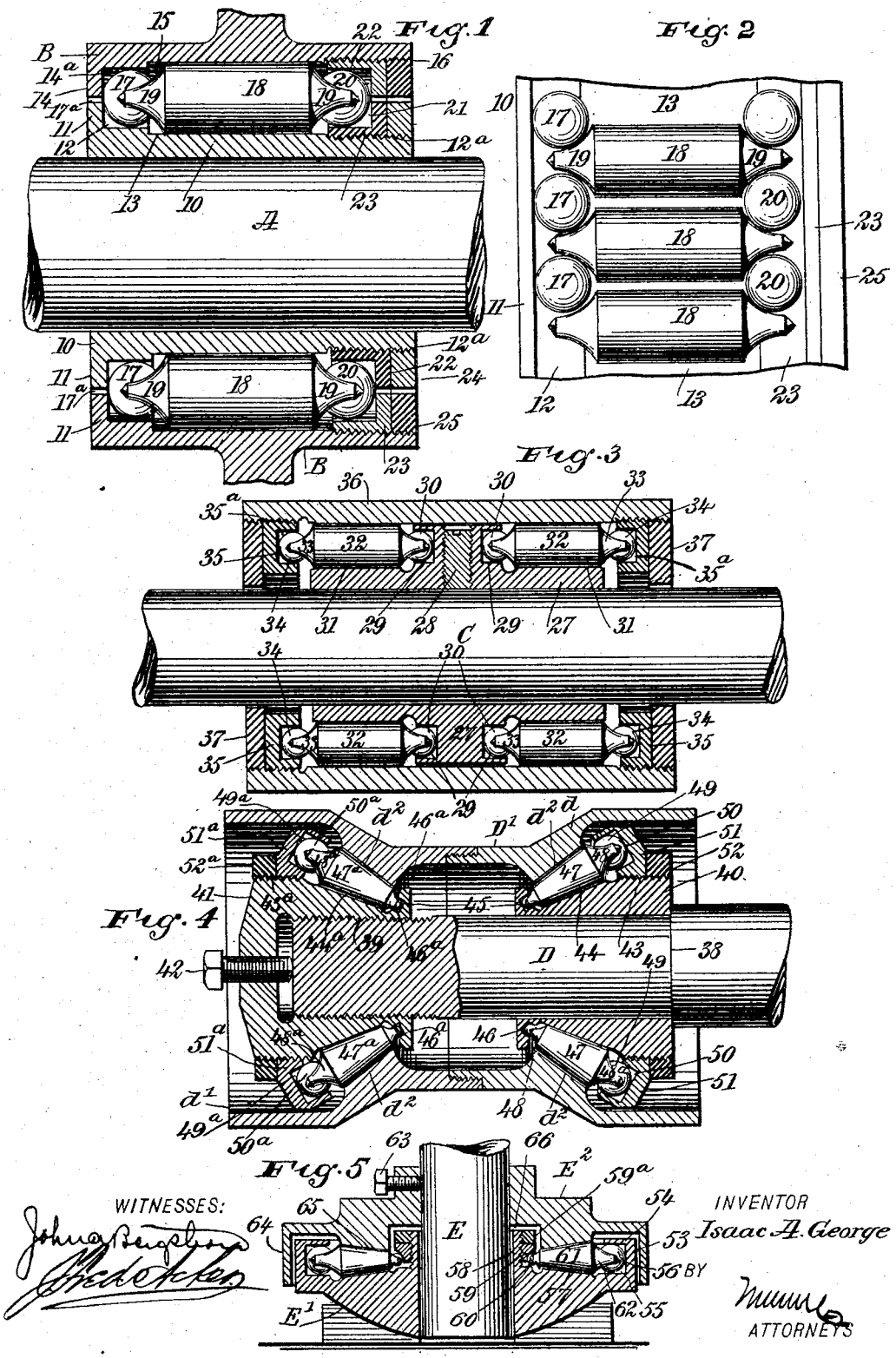
WITNESSES:
INVENTOR
Isaac A. George
BY
ATTORNEYS

UNITED STATES PATENT OFFICE.

ISAAC ANDREW GEORGE, OF HASTINGS, NEBRASKA.

ROLLER-BEARING.

No. 796,995.　　　　Specification of Letters Patent.　　　Patented Aug. 15, 1905.

Application filed July 1, 1903. Serial No. 163,883.

*To all whom it may concern:*

Be it known that I, ISAAC ANDREW GEORGE, a citizen of the United States, and a resident of Hastings, in the county of Adams and State of Nebraska, have invented a new and useful Improvement in Roller-Bearings, of which the following is a full, clear, and exact description.

The purpose of the invention is to provide a roller-bearing construction in which a free uncaged race is obtained and in which rollers and balls act in conjunction, the rollers being held spaced by the balls, wherein the rollers are self-adjusting as to end thrust, and wherein, further, no one roller can take more shock than another.

A further object is to provide a tapering construction of rollers acting in conjunction with balls and self-adjusting as to load and end thrust, which rollers are not necessarily of the same diameter or length, but nevertheless will each take an equal amount of load.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a vertical section through the hub of a loose pulley, showing the application of the roller-bearings thereto and a shaft in side elevation, together with a sleeve on the shaft, and also shown in section, around which sleeve the hub of the pulley revolves. Fig. 2 is a plan view of a portion of the sleeve shown in Fig. 1 and the rollers and balls in position on the sleeve. Fig. 3 is a longitudinal section of the bearings for a line-shaft, the shaft appearing in side elevation. Fig. 4 is a longitudinal section through an end bearing of a shaft, which shaft appears in sectional side elevation, illustrating the adaptation of tapered rollers in connection with balls; and Fig. 5 is a vertical section through a thrust-bearing, the shaft appearing in plan view, illustrating a further adaptation of the tapering or conical form of rollers.

With reference to the construction shown in Figs. 1 and 2, in which figures the invention is shown applied to a loose pulley, A represents a shaft on which a sleeve 10 is secured in any suitable or approved manner. This sleeve at one end is provided with a marginal flange 11, forming thereby an annular ball-race 12, and is further provided with an exterior annular race 13 deeper than the annular race 12. Both of these races 12 and 13 are uninterrupted throughout the periphery of the sleeve, and the central or deeper race 13 is adapted to receive bearing-rollers to be hereinafter described.

The hub B of a pulley is adapted to turn around the said sleeve 10, being spaced slightly therefrom, and the said hub B is provided at one end with an annular marginal flange 14, corresponding to the flange 11 of the sleeve 10, as is shown in Fig. 1, forming thereby an annular ball-race $14^a$, corresponding to and registering with the ball-race 12 in the sleeve 10, and the said hub B is further provided with a wider race 15, adapted to receive the rollers above referred to. The race 15 in the hub B corresponds to the race 13 in the sleeve 10, the race 15 being deeper than the ball-race $14^a$. At the opposite end of the sleeve 10 the said sleeve is provided with an exterior thread $12^a$, and the hub B has a corresponding interior thread 16 formed thereon.

The space $17^a$ between the flange 14 of the hub and the flange 11 of the sleeve 10 may be utilized for introducing oil into the registering races 12 and $14^a$, in which races balls 17 are loosely placed, engaging with the opposing circumferential walls of the said races, as is illustrated in Fig. 1. The body portions of rollers 18 are located in the combined races 13 and 15, engaging with the circumferential walls thereof. The rollers 18 are cylindrical and are provided with conical ends 19, one of the conical ends of each roller being adapted to be introduced between opposing balls 17, as is particularly illustrated in Fig. 2.

The opposite conical ends 19 of the rollers 18 are introduced between corresponding balls 20, which are located in an annular race 21 at the opposite end of the sleeve and the hub, and this race 21 is formed of two rings 22 and 23, provided with outer marginal flanges adapted to approach each other, as is illustrated in Fig. 1, the ring 22 being secured to the threaded surface 16 of the hub and the ring 23 to the threaded surface $12^a$ of the sleeve. These flanged rings forming the said race 21 are held in position by means of locking-rings 24 and 25, the ring 24 being secured to the sleeve 10 and the ring 25 to the hub B. The rollers 18 are of such length that they may have more or less end movement in the combined races 13 and 15.

It will be observed that no load is carried by the balls and that all of the load is sustained by the rollers 18, that the rollers and balls are unobstructed in their movements, and that the rollers will adjust themselves endwise, as may be required by the location of the load or the conditions of the surface traveled over.

In Fig. 3 I have illustrated the application of the improved roller-bearings to the bearings for a line-shaft C. A sleeve 27 is secured to the line-shaft C by means of a screw 28 or its equivalent, and at each side of the center of the said sleeve 27 a ball-race 29 is formed in which balls 30 are adapted to freely travel, the said races being annular, and between the ball-races 29 and the outer ends of the said sleeve 27 deeper races 31 are formed. These deeper races 31 are adapted to receive the body portions of cylindrical rollers 32, the roller-races 31 being likewise annular and unobstructed. These rollers 32 are provided with conical ends 33, the inner ends of the said rollers 32 entering the spaces between opposing balls 30. The opposite or outer ends of the rollers 32 are made to enter the spaces between balls 34, and these balls have free movement in races $35^a$, which are formed, preferably, in channeled rings 35, loosely mounted around the line-shaft C and having a threaded connection with a casing 36, the inner surface of which is cylindrical, one of said races $35^a$ being located at each end of the said casing, and these channeled rings 35, forming the races $35^a$, are held in position by means of disks 37, likewise secured to the inner surface of the casing 36, the said disks having openings therein to permit the shaft C to freely pass through them. The races $35^a$, which correspond to the races 21 shown in Fig. 1, are formed each in a single piece of material, as there is no load carried by the balls, all the load being on the rollers 32, and said rollers have unobstructed end thrust when any is required.

In Fig. 4 I have illustrated the adaptation of the invention to the end bearings of a shaft D, which shaft near its end is shown as provided with a shoulder 38, as the end portion of the shaft is reduced in diameter as is illustrated, and the extreme end portion of the shaft D is provided with an exterior thread 39. A bearing-block 40 is secured on the shaft D, its inner end being in engagement with the said shoulder 38 on the shaft. At the outer end of the shaft D an end bearing-block 41 is located, having a threaded aperture to receive the threaded end 39 of the shaft. The said end bearing-block 41 is held in proper relation to the shaft D by means of a set-screw 42, passed through an end of the end bearing-block 41 into engagement with the end of the shaft D. The inner bearing-block 40 at its inner end is provided with an exteriorly-threaded surface 43, and from the outer end of this threaded portion 43 the exterior of the inner bearing-block 40 is given a downward and inward inclination, as shown at 44, extending to a ball-race 45 at the outer end of the said bearing-block 40. In this race 45, which is annular, balls 46 are free to travel. Conical rollers 47, diminishing in diameter in direction of their outer ends, have their body portions mounted to turn upon the inclined surface 44 of the inner bearing-block 40, and these conical rollers 47 are provided with conical ends 48, the inner conical ends being entered into the spaces between opposing balls 46 in the race 45, while the outer ends of the said conical rollers 47 are made to enter spaces between larger balls 49, adapted to travel in a race 50, which consists of a channeled ring 51, having its channeled surface inclined in direction of the inclination of the rollers, and the said channeled ring 51 is screwed upon the threaded surface 43 of the bearing-block 40 and is held in position by a locking-ring 52, screwed upon the said surface 43. The construction of the end bearing-block 41 is substantially the same as that of the inner bearing-block 40, the end bearing-block 41 being provided with an exterior-threaded surface $43^a$ at its outer end portions and an inclined surface $44^a$, which extends from the threaded surface inward to the ball-race 45 at the inner end of the said bearing-block 41, in which balls $46^a$ are adapted to travel. Conical rollers $47^a$ have their body portions adapted to travel on the inclined surface $44^a$, said rollers $47^a$ terminating in conical ends $48^a$, the inner ends of the rollers being entered between the balls $46^a$, while the outer ends of the rollers are made to enter the spaces between larger balls $50^a$, adapted to travel in a race $49^a$, constructed in a channeled ring $51^a$ in like manner as the race 50 at the opposite end of the device, said ring being screwed upon the threaded surface $43^a$ of the bearing-block 41 and held in place by a locking-ring $52^a$, likewise screwed upon the aforesaid threaded surface $43^a$.

The parts just described are located within a casing D', which is preferably made in two sections $d$ and $d'$, having a threaded connection. The casing D' is of greater diameter at its ends than at its central portion and is provided with interior beveled surfaces $d^2$, opposed to the beveled surfaces 44 and $44^a$ on the bearing-blocks 40 and 41, and these beveled surfaces $d^2$ engage with the conical rollers 47 and $47^a$, the combined surfaces 44 and $d^2$ and $44^a$ and $d^2$ constituting races for the said conical rollers 47 and $47^a$.

The taper roller type shown in Fig. 4 fully exemplifies the possibilities of the invention, as it shows self-adjusting taper roller-bearings so placed that all the rollers on the under side of the shaft or axle will carry an equal amount of load regardless of the small difference in the size or length of the rollers, and the rollers are separated one from the other each by an interposed ball. The rollers are uncaged and have a free race, as have likewise the balls.

In Fig. 5 I have illustrated the application of the conical form of bearing-rollers to a thrust or step bearing for a shaft E, which thrust-bearing consists of a bottom stationary section E' and an upper section E², which is adapted to turn with the shaft E, being secured thereto by a set-screw 63 or a like device. The lower or stationary section E' of the bearing is provided with an upwardly-extending marginal flange 53 and an upper horizontal flange 54, carried inward from the vertical marginal flange 53 to form an annular race 55, in which balls 56 are free to travel, and the upper face of the fixed section E' of the bearings is provided with a surface 57, inclined downwardly and outwardly from an exteriorly-threaded collar 58, loosely fitting around the shaft E to the ball-race 55. A cone 59 is screwed upon the collar 58, forming thereby a race in conjunction with the upper surface of the section E' of the bearing, in which race small balls 60 are mounted to freely turn, and this cone 59 is held in position by a suitable locking-ring 59ª, also screwed upon the collar 58. Conical bearing-rollers 61 are made to travel upon the inclined surface 57 of the lower section E' of the bearing, and these bearing-rollers have conical ends 62. The outer ends extend into the spaces between the larger balls 56 and the opposite ends into the spaces between the smaller balls 60. The upper section E² of the bearing, which is attached to the shaft E, is provided with a downwardly-extending marginal flange 64, adapted to extend loosely outside of the upwardly-extending marginal flange of the lower section E' of the bearing, and in the under face of the upper section E² of the bearing an inclined surface 65 is made opposite the inclined surface 57, and between these two surfaces 57 and 65 the bearing-rollers 61 are adapted to travel, and these two surfaces constitute a race for the said bearings. At the central upper portion of the upper section E² of the said bearing a recess 66 is made in order to accommodate the collar 58 of the lower member of the bearing and the parts carried by the collar.

It will be observed that in each construction shown the rollers are held spaced by balls and that the balls act in conjunction between two extended reduced concave conical roller ends. It is further apparent that the rollers have elastic end thrust, thus adding materially to their duration of proper service.

Having thus described my invention, I claim as new and desire to secure by Letters Patent—

1. In a bearing, a supporting member and a supported member presenting oppositely-disposed bearing-surfaces, rollers with conical ends disposed between said bearing-surfaces, and balls arranged between the conical ends of said rollers and between said supporting and supported members, said supporting and supported members having coöperating means for preventing sliding movement of said members longitudinally of said rollers.

2. In a bearing, a supporting member and a supported member presenting oppositely-disposed bearing-surfaces, tapered rollers with conical ends disposed between said bearing-surfaces and freely movable therebetween, and freely-movable spacing members between the ends of said rollers whereby said rollers are permitted to adjust themselves automatically to compensate for any slight difference in size and to receive equal portions of the load.

3. In a bearing, a supporting member and a supported member presenting oppositely-disposed bearing-surfaces, tapered rollers presenting concave conical ends freely movable between said surfaces, and spacing members disposed between the conical ends of said rollers whereby automatic adjustment of said rollers to compensate for any slight difference in size is permitted.

4. In a bearing, a supporting member and a supported member presenting oppositely-disposed bearing-surfaces, the space between said surfaces forming free raceways, tapered rollers having conical ends disposed in said raceways and freely movable therein, and freely-movable antifriction spacing members disposed between the conical ends of said rollers whereby automatic adjustment of said rollers longitudinally of their axes is permitted.

5. In a bearing, a supporting member and a supported member presenting oppositely-disposed bearing-surfaces, said bearing-surfaces being of conical form, and the space between said surfaces forming raceways adapted to receive tapered rollers, tapered rollers disposed in said raceways and freely movable therein, said rollers having conical ends, and balls disposed between the conical ends of said rollers and freely movable in said raceways.

In testimony whereof I have signed my name to this specification in the presence of two subscribing witnesses.

ISAAC ANDREW GEORGE.

Witnesses:
FREDERICK J. SCHAUFELBERGER,
VOLNEY B. TRIMBLE.